(12) United States Patent  
Fevre et al.

(10) Patent No.: US 9,259,887 B2
(45) Date of Patent: Feb. 16, 2016

(54) METHOD OF FORMING A CONTAINER BY BLOWING AND FILLING

(75) Inventors: Sebastien Fevre, Octeville sur Mer (FR); Guy Feuilloley, Octeville sur Mer (FR)

(73) Assignee: DISCMA AG, Hunenberg (CH)

( * ) Notice: Subject to any disclaimer, the term of this patent is extended or adjusted under 35 U.S.C. 154(b) by 376 days.

(21) Appl. No.: 13/810,685

(22) PCT Filed: Jul. 12, 2011

(86) PCT No.: PCT/EP2011/061830
§ 371 (c)(1),
(2), (4) Date: Jan. 17, 2013

(87) PCT Pub. No.: WO2012/010460
PCT Pub. Date: Jan. 26, 2012

(65) Prior Publication Data
US 2013/0113143 A1    May 9, 2013

(30) Foreign Application Priority Data

Jul. 20, 2010  (FR) ...................................... 10 55882

(51) Int. Cl.
*B29D 22/00*  (2006.01)
*B29C 49/46*  (2006.01)
*B29C 49/58*  (2006.01)
*B65B 3/02*   (2006.01)
*B29C 49/06*  (2006.01)
*B29C 49/12*  (2006.01)

(52) U.S. Cl.
CPC ............. *B29D 22/003* (2013.01); *B29C 49/46* (2013.01); *B29C 49/58* (2013.01); *B65B 3/022* (2013.01); *B29C 49/06* (2013.01); *B29C 49/12* (2013.01); *B29C 2049/465* (2013.01); *B29C 2049/4664* (2013.01); *B29C 2049/5837* (2013.01); *B29C 2049/5841* (2013.01)

(58) Field of Classification Search
None
See application file for complete search history.

(56) References Cited

U.S. PATENT DOCUMENTS

| 4,217,328 A * | 8/1980 | Cambio, Jr. ................... 264/504 |
| 8,017,064 B2 * | 9/2011 | Andison et al. ............... 264/524 |

FOREIGN PATENT DOCUMENTS

| EP | 2 143 544 | 1/2010 |
| WO | 99/50047 | 10/1999 |
| WO | 02/02295 | 1/2002 |
| WO | 2006/096916 | 9/2006 |

OTHER PUBLICATIONS

International Search Report dated Aug. 25, 2011, corresponding to PCT/EP2011/061830.

* cited by examiner

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

A method of forming a container (18), includes: a partial expansion first step (E1) during which the container (18) is filled with a pressurized blowing gas (G); a second step (E2) of filling the container (18) during which the container (18) is filled with a filling liquid (L) that expels the blowing gas (G) through an outlet orifice (34); and a third step (E3) during which the contents of the container (18) are put under a pressure (HP) so as to make the container (18) conform to its final state (18D), characterized in that, during the filling second step (E2), the ratio of the flow rate of the incoming filling liquid (L) to the flow rate of the outgoing blowing gas (G) is controlled so as to allow the container (18) to continue to expand during this second step (E2).

8 Claims, 4 Drawing Sheets

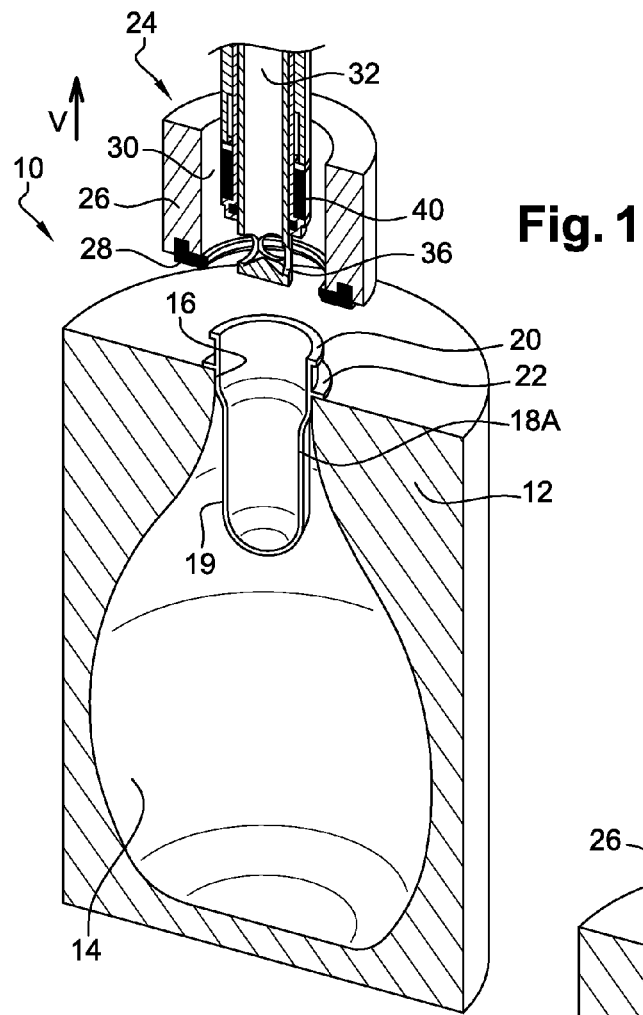
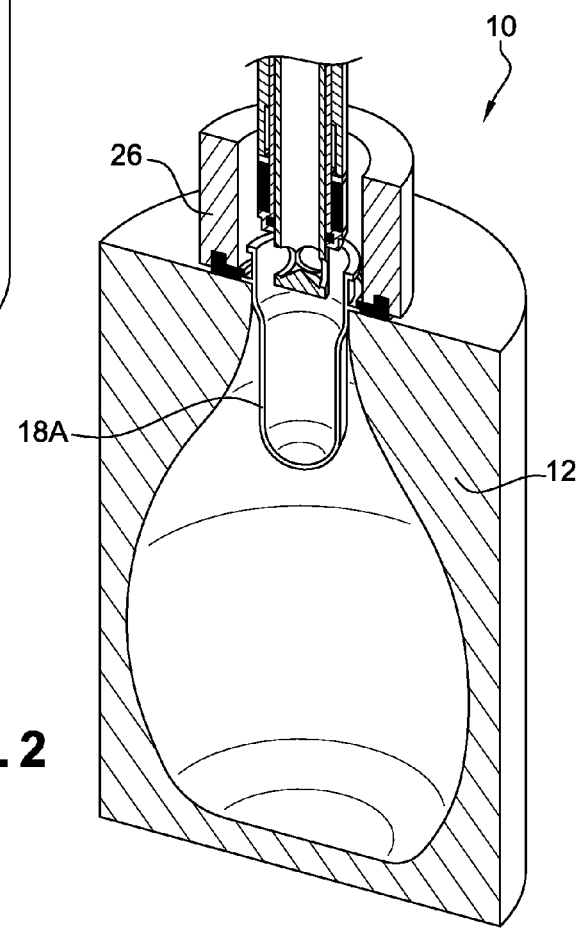
Fig. 1
Fig. 2

METHOD OF FORMING A CONTAINER BY BLOWING AND FILLING

The present invention relates to a process for shaping a thermoplastic container, comprising a step of partially expanding it by means of a gas and a step of shaping it by means of a liquid.

The present invention more particularly relates to a process for shaping a container made of preheated thermoplastic from a parison state to a final state, the container being inserted into a cavity bounded by an impression, the process comprising:

a first step of partially expanding the container during which it is filled with a pressurized blowing gas so as to blow the container into an intermediate state between its parison state and its final state;

a second step of filling the container during which the container is filled with a filling liquid that flushes the blowing gas through an outlet orifice of the container;

a third step of shaping the container during which its content is placed under sufficient pressure to press the walls of the container firmly against the impression in the mold in order to give the container the shape it is to have in its final state.

The manufacture of thermoplastic containers, such as large or small bottles, etc. is carried out by shaping containers provided in a parison state, which are sometimes called preforms.

Before the shaping process is carried out, the preforms are heated in an oven so as to make them malleable enough for the shaping process.

These preforms are then introduced into a molding device which is generally associated with blow molding or stretch blow molding means.

After the shaping process, a filling step is carried out. During this filling step, the container in its final state is generally filled with a liquid that is intended to be sold or transported in the container.

Document EP-A-2 143 544 suggested modifying the shaping process by using a liquid to finish shaping the container. This prior-art process thus comprises a first step of partially expanding the container from its parison state to an intermediate state by blowing a low-pressure blowing gas into the container, then a second step of filling the container in said intermediate state with a filling liquid, and finally, a third step of shaping the container in which the liquid contained in it is placed under a high pressure in order to give the container its final shape.

The filling liquid is generally incompressible relative to a gas. This allows the pressure to be increased rapidly and efficiently.

Advantageously, the liquid used during the shaping third step is the liquid that is intended to be transported in the container in its final state. Such a process thus allows the container to be filled with liquid during the shaping process. This especially allows time to be saved by avoiding an additional filling operation after the shaping process.

The present invention has the aim of improving such a shaping process so as to make it more rapid and more efficient, and so as to produce better quality final containers.

For this purpose, the invention provides a shaping process of the type described above, noteworthy in that during the filling second step, the ratio of the flow rate of filling liquid entering to the flow rate of blowing gas exiting is controlled so that the overall pressure inside the container is high enough to allow the expansion of the container to continue during this second step.

According to other features of the invention:

the overall pressure inside the container is constant during the filling second step;

the overall pressure inside the container varies with time during the filling second step;

the overall pressure inside the container continuously increases with time during the filling second step;

the overall pressure inside the container is controlled by controlling the flow rate of filling liquid entering during the filling second step; and the overall pressure inside the container is controlled by controlling the flow rate of blowing gas exiting during the second step.

Other features and advantages of the invention will become apparent on reading the following detailed description, which will be better understood with reference to the appended drawings, in which:

FIG. 1 is an axial cross-sectional view in perspective, which shows a shaping device for implementing the shaping process according to the teachings of the invention;

FIGS. 2 to 7 show similar views to that in FIG. 1, these views showing the shaping device during the implementation of the shaping process.

Figure 3:
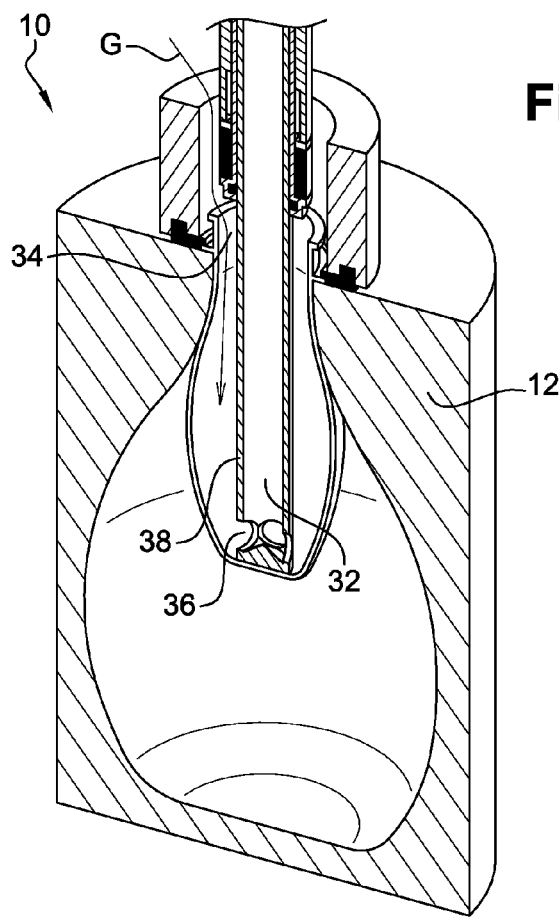

In the rest of the description, a nonlimiting vertical orientation directed from bottom to top, indicated by the arrow "V" in the figures, and a nonlimiting radial orientation directed orthogonally outward from the axis of the container, will be adopted. The direction of flow of the fluids will be directed from upstream to downstream.

In the rest of the description, elements having analogous, identical or similar functions will be denoted by the same reference numbers.

FIG. 1 shows a shaping device 10 that is able to implement a process according to the teachings of the invention.

The shaping device 10 comprises a mold 12 that is generally made of a plurality of portions that may be separated so as to insert and/or extract the container before and after it has been shaped. For the sake of clarity, only one portion of the mold 12 is shown in the figures.

Below, when reference is made to the mold 12 it will be understood that, unless otherwise stated, the mold 12 is in its closed position.

The mold 12 is here made of two portions that can be radially separated from each other. Each portion comprises a concave half impression of the final container to be obtained (bases, walls, shoulder). Thus, when the two portions are joined together to form the mold 12, the two half impressions form a cavity 14 bounded by an impression of the final shape of the container in its final state.

As a variant, the molds comprise three portions: a portion containing the impression of the base of the container, and two portions forming the walls and shoulder of the container.

An upper orifice 16 opens the top of the cavity 14 vertically.

The mold 12 is intended to house a container 18 made of thermoplastic. Such a container 18 in the parison state is generally called a preform. The container 18 in the parison state is preheated in order to make the thermoplastic malleable enough to allow the container 18 to be blow molded, or expanded, so as to form a container in the final state.

Figure 4:
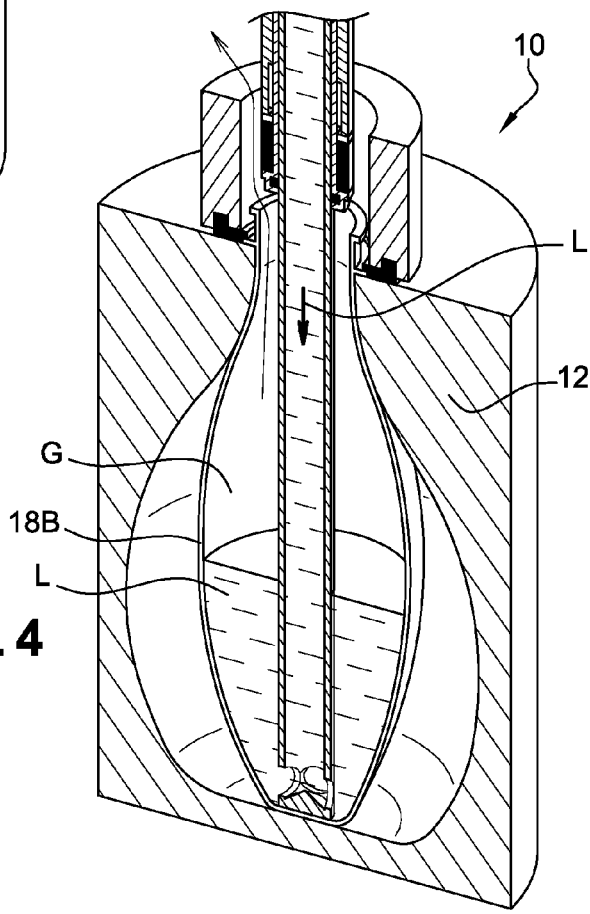
Figure 5:
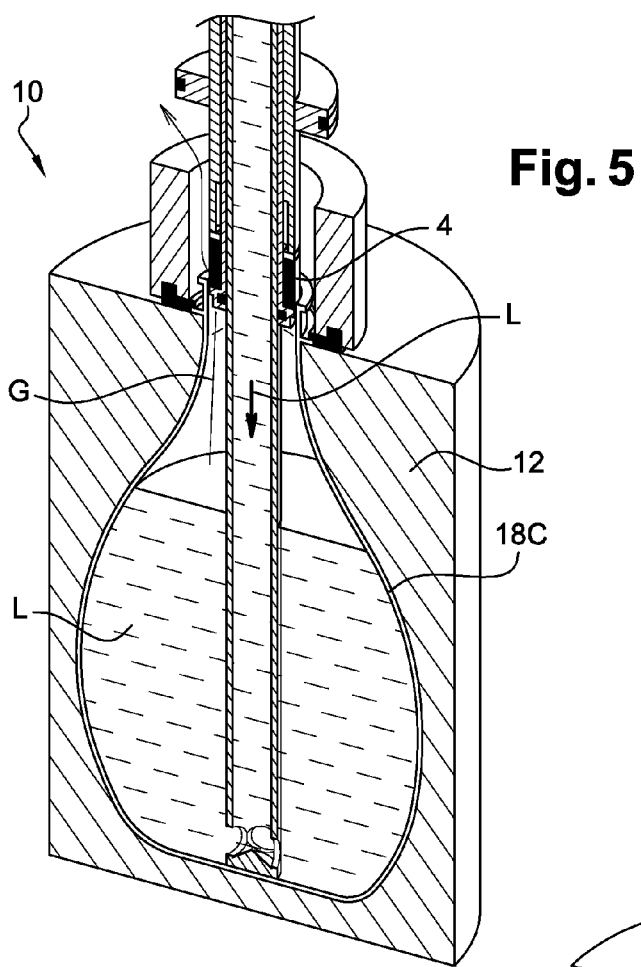
Figure 7:
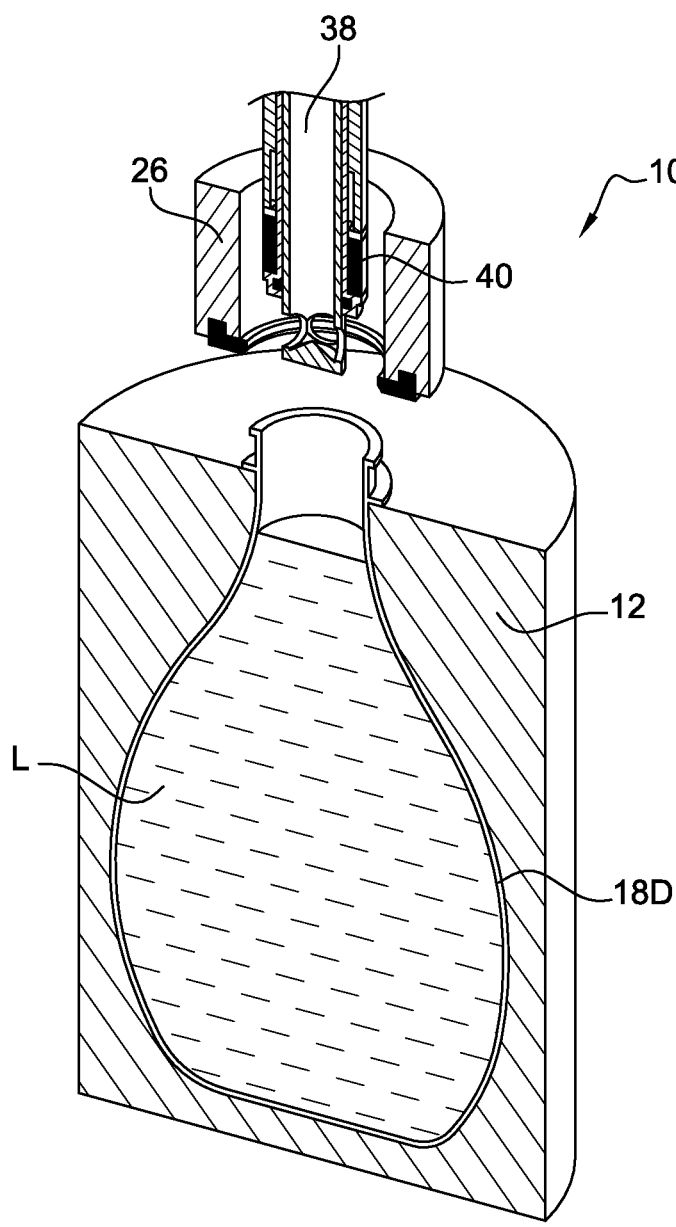

In the rest of the description, when it is necessary to specify the state of the container 18, the container 18 in the parison state will be denoted by the reference number "18A", and the container 18 in the final state, as shown in FIG. 7, will be denoted by the reference number "18D". As will be explained below, the container 18 is also capable of occupying an intermediate state that will be denoted by the reference number "18B", as shown in FIG. 4, and a second intermediate state that will be denoted by the reference number "18C", as shown in FIG. 5.

The container 18 generally comprises a hollow body 19 that is open at the top via an orifice bounded radially by a neck 20, also called a month.

As is known, generally the neck 20 of the container 18 already has its final shape when the container 18 is in the parison state 18A. The dimensions of the neck 20 must therefore not change during the shaping process. For this reason, only the body 19 of the container 18 in the parison state 18A is housed in the cavity 14 of the mold 12, the neck 20 extending out of the cavity 14 via the upper orifice 16 in order to prevent any accidental deformation.

The body 19 of the container 18 is separated from the neck 20 by a collar 22 that protrudes radially outward. The collar 22 here keeps the neck 20 out of the cavity 14 of the mold 12 by resting on an upper surface of the mold 12.

The shaping device 10 comprises a nozzle 24 that consists of a vertical tube arranged vertically above the upper orifice 16 of the mold 12. The nozzle 24 comprises an aperture at its lower end, which forms a snout 26. Only the lower end of the nozzle 24 has been shown in the figures.

The nozzle 24 generally slides vertically between an inactive up position, which is shown in FIG. 1, and an active down position, which is shown in the following figures.

The nozzle 24 forms a pneumatic duct that is capable of being supplied with a pressurized blowing gas.

The snout 26 is designed so that, in the active down position, the tube of the nozzle 24 seals the interior of the container 18 in the parison state 18A. Thus, the container 18 is capable of being filled with pressurized blowing gas, which enters via the neck 20 in order to blow mold the container 18, as will be described in more detail below.

In the example shown in the figures, the nozzle 24 is a bell nozzle in which the snout 26 of the nozzle 24 has a bell shape that covers the neck 20 when the nozzle 24 is in its active down position. The bottom edge of the snout 26 is then equipped with a seal 28 that is pressed vertically downward against the upper surface of the mould 12 or against the collar 22 of the neck 20.

For the sake of clarity, the snout 26 is shown in axial cross section in the figures. It will be understood that the snout 26 has a cylindrical shape, so as to completely encircle the neck 20.

The nozzle 24 of the shaping device 10 is equipped with at least one hydraulic duct 32 that is separate from the nozzle 24. Thus, the blowing gas and the filling liquid supplied to the container 18 are not delivered via a common duct.

Since the neck 20 has a cylindrical shape, it is advantageous for the hydraulic duct 32 to be concentric with the nozzle 24.

In the embodiment shown in the figures, as will be described below, the blowing gas is injected into the container 18 via the neck 20. Likewise, said blowing gas escapes via the neck 20 during filling with the liquid. Specifically, since the density of the blowing gas is generally higher than the density of the filling liquid, it is preferable for the blowing gas to be allowed to escape through a top portion of the container 18.

According to a variant of the invention (not shown), the shaping device 10 comprises an injection orifice that is intended only for introducing the blowing gas, and an escape orifice that is intended only for removing the blowing gas. In this case, the escape orifice is preferably formed by the neck 20 of the container 18. The injection orifice may be arranged anywhere inside the container 18 or at the neck 20.

The hydraulic duct 32 opens into the container 18 via a filling orifice 36.

In the example shown in the figures, the hydraulic duct 32 is formed inside a vertical hollow rod 38 that is fitted concentrically inside the nozzle 24. The lower end of the rod 38 comprises at least one filling orifice 36.

The rod 38 can slide independently of the nozzle 24 between a rest, up position in which the lower end of the rod 38 is located outside of the container 18, and a down position in which the lower end of the rod 38 is located inside the container 18, here near the bottom of the container 18.

As a variant, the filling orifice is located at the neck 20.

The rod 38 has a smaller diameter than the inside diameter of the neck 20. Thus, when the rod 38 is in its down position, the blowing gas passes into the container 18 via a pneumatic orifice having an annular shape that is bounded radially toward the exterior by the neck 20 and radially toward the interior by the rod 38.

In a nonlimiting way, the shaping device 10 also comprises means for stretching the container 18. The stretching means are advantageously formed by the rod 38. Thus, during its descent toward an extreme down position, the rod 38 is capable of pushing the base of the container 18 in the parison state 18A in order to cause the container 18 to lengthen downward in a vertical direction.

The device 10 furthermore comprises controlled means for sealably plugging the pneumatic orifice 34 in order for the container 18 to be connected in a sealed manner only to the filling orifice 36.

The plugging means are formed here by an annular plug 40 that encircles the rod 38 and that is fitted so as to be able to slide vertically inside the nozzle 24 between a standby up position in which it is arranged at a distance from and in line with the pneumatic orifice 34, and a plugging down position in which the plug 40 blocks the pneumatic orifice 34. The plug 40 here comprises an annular seal that is designed to be radially compressed, between the neck 20 and the rod 38, when it is the plugging down position.

The shaping process carried out using the shaping device 10 essentially comprises three successive steps which will be denoted "E1", "E2" and "E3".

The first step "E1" of the shaping process starts after a preheated container 18 in the parison state 18A has been arranged in the cavity 14 of the mold 12, as shown in FIG. 1. The two portions of the mold 12 are then closed so as to form the cavity 14. The nozzle 24, the rod 38 and the plug 40 each occupy their up position.

In a first step "E1" of partially expanding the container 18, the latter is filled with a blowing gas at a low pressure "BP" so as to cause the container 18 to expand into a first intermediate state 18B between its parison state 18A and its final state 18D. For this purpose, as shown in FIG. 2, the nozzle 24 is moved into its active down position whereas the rod 38 and the plug 40 respectively remain in their up position.

As shown in FIG. 3, the blowing gas "G", such as air, is injected at a low pressure "BP" into the container 18 via the nozzle 24. The pressure of the injected gas is for example between 4 and 10 bar. The container 18 in the parison state 18A starts to expand under the effect of the pressure "BP" that the blowing gas "G" exerts on its walls. In the following this operation will be called the blowing operation.

During this first step "E1", the rod 38 may also be made to descend toward its extreme down position so as to push the base of the container 18 in the parison state 18A toward the bottom of the cavity 14. This makes it possible to stretch the container 18 axially downward. This operation is known as the "stretching operation".

During this first step "E1", the filling orifice 36 is not supplied with filling liquid.

The stretching operation may start before, after or at the same time as the blowing operation, depending on a number of parameters known to those skilled in the art, in order to modify the material thickness distribution of the container.

Next, when the container 18 reaches a first intermediate state 18B between its parison state 18A and its final state 18D, as illustrated in FIG. 4, a second step "E2" of filling the container 18 is triggered.

In this second step "E2", the container 18 is filled with the filling liquid "L", as is shown in FIG. 4. The filling liquid "L" is supplied at a pressure higher than the pressure of the blowing gas "G" contained in the container 18, via orifices 36 located at the lower end of the rod 38. For this reason, the lower end of the rod 38 is located inside the container 18 during the second step "E2".

During this second step "E2", the stretching operation may continue or stop.

Figure 6:
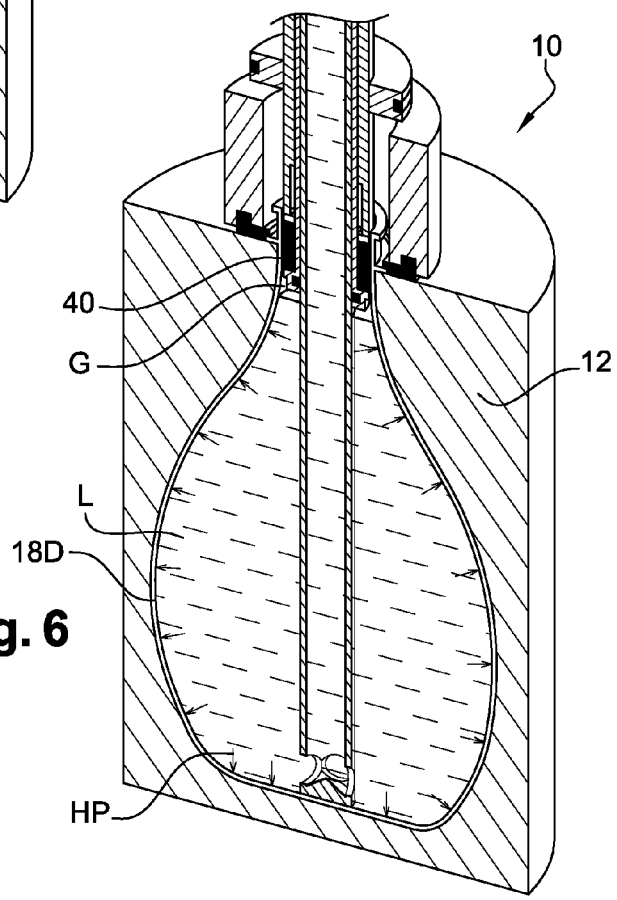

In the example shown in FIGS. 4, 5 and 6, the rod 38 remains in its extreme down position until the end of the shaping process.

As the filling liquid "L" gradually fills the container 18, the blowing gas "G" is flushed through the neck 20, which now forms an orifice allowing the blowing gas "G" to exit since the supply of blowing gas "G", via the nozzle 24, is stopped.

The ratio of the flow rate of filling liquid "L" entering to the flow rate of blowing gas "G" exiting is controlled so that the overall pressure inside the container 18 is high enough to allow the expansion of the container 18 to continue during this second step "E2" until a second intermediate state 18C is reached between the first intermediate state 18B and the final state 18D, as shown in FIG. 5.

The overall pressure inside the container 18 during the filling second step "E2" preferably varies with time. The overall pressure inside the container 18 during the filling second step "E2" may for example continuously increase with time so as to cause the container 18 to expand continuously.

The pressure is thus steadily increased until a maximum degassing pressure "BPmax" is obtained, for example 10 bar.

According to a variant of the invention (not shown), the overall pressure inside the container during the filling second step is constant.

In order to control the ratio of the filling flow rate and the flow rate of the exiting blowing gas "G" it is possible to control:

the flow rate of filling liquid "L" entering; and/or
the flow rate of blowing gas "G" exiting.

According to a first embodiment of the invention, at the start of the second step "E2", the blowing gas "G" in the nozzle 24 is fed to a dead end. The pressure of the blowing gas "G" contained in the nozzle 24 is then the same as the pressure of the blowing gas "G" in the container 18.

The nozzle 24 is connected to a relief valve (not shown) via a valve (not shown) that is opened during the second step "E2". The relief valve is the only way for the blowing gas "G" to exit from the nozzle 24.

This relief valve is set so as to open when the pressure of the blowing gas "G" in the nozzle 24 reaches the maximum degassing pressure "BPmax".

Thus, when the container 18 is filled with filling liquid "L", the blowing gas contained in the container 18 is flushed toward the nozzle 24, thus increasing the pressure both in the container 18 and in the nozzle 24. This allows expansion of the container to continue. When the pressure reaches the maximum degassing pressure "BPmax" the relief valve opens allowing the blowing gas "G" to escape to the exterior.

During this second step "E2", the flow rate of filling liquid "L" may remain constant or vary depending on the shape desired for the curve of increase in overall pressure.

According to a second embodiment of the invention, the section of the orifice 34 through which the blowing gas exits is used to calculate a maximum escape flow rate for the blowing gas "G". It is then possible to control the flow rate of the filling liquid "L" so that the flow rate for the filling liquid "L" is higher than the maximum escape flow rate.

The level of the incompressible filling liquid "L" thus rapidly increases, flushing the blowing gas "G" out of the container 18 like a piston. Since the volume of liquid "L" injected is higher than the volume of gas "G" flushed out, per unit time, this causes, mechanically, an increase in the pressure in the container 18.

It is of course possible to combine the two embodiments described above in order to obtain a suitable overall pressure variation curve depending on the shape of the container 18, on the shape of the cavity 14, on the material forming the container 18, on the temperature of the container 18, or on other parameters known to those skilled in the art.

Whatever embodiment is used, the hydraulic duct 32 supplies the container 18 with filling liquid "L" at a pressure higher than the overall pressure inside the container 18.

When the container 18 reaches its second intermediate state 18C, as shown in FIG. 5, a shaping third step "E3" is triggered.

The plug 40 is then lowered into its plugging down position so as to prevent the filling liquid "L" from exiting the container 18, as shown in FIG. 6. The content of the container 18 is then essentially formed by the filling liquid "L", however a small pocket of blowing gas "G" may possibly remain under the plug 40 without adversely affecting the implementation of this third step "E3".

Next, the content of the container 18 is placed under a high pressure "HP", this pressure being high enough that the walls of the container 18 are pressed firmly against the impression in the mold 12, in order to give the container 18 its final shape, as shown in FIG. 6. The high pressure "HP" is for example equal to 40 bars.

The pressure "HP" is advantageously obtained by increasing the pressure of the filling liquid "L" in the hydraulic duct. Since the filling liquid "L" is incompressible, the pressure increase is faster and more efficient than obtained with a compressible gas.

After this third step "E3", the container 18 has reached its final state 18D. The plug 40, the rod 38 and the nozzle 24 are then respectively moved to their up position, as shown in FIG. 7.

Thus the container 18 is already filled with filling liquid "L" when it is removed from the mold 12 after the shaping process.

The shaping process according to the teachings of the invention is advantageously short because use is made of the filling second step "E2" to continue the expansion of the container 18.

Furthermore, this time saving also results in higher quality because the expansion of the container 18 is not stopped during the filling of the container 18, preventing the material from cooling and setting.

In addition, it will be observed that expanding the container 18 in the filling second step "E2" of the shaping process according to the invention allows a container 18 to be obtained in its final state 18D using substantially less power than prior-art shaping processes.

The invention claimed is:

1. A process for shaping a container made of preheated thermoplastic from a parison state to a final state, the container being inserted into a cavity bounded by an impression, the process comprising:
- a first step (E1) of partially expanding the container during which it is filled with a blowing gas (G) at a pressure (BP) so as to blow the container into an intermediate state between its parison state and its final state;
- a second step (E2) of filling the container during which the container is filled with a filling liquid (L) at a pressure higher than the pressure (BP) of the blowing gas, whereby the filling liquid flushes the blowing gas (G) through an outlet orifice of the container;
- a third step (E3) of shaping the container during which its content is placed under sufficient pressure (HP) to press the walls of the container firmly against the impression in the mold in order to give the container the shape it is to have in its final state;
- wherein during the second step (E2), the ratio of the flow rate of filling liquid (L) entering to the flow rate of blowing gas (G) exiting is controlled so that the overall pressure inside the container is high enough to allow the expansion of the container to continue during this second step (E2) under the influence of both the blowing gas and filling liquid.

2. The process as claimed in claim 1, wherein the overall pressure inside the container is constant during the filling second step (E2).

3. The process as claimed in claim 1, wherein the overall pressure inside the container varies with time during the filling second step (E2).

4. The process as claimed in claim 1, wherein the overall pressure inside the container continuously increases with time during the filling second step (E2).

5. The process as claimed in claim 4, wherein the overall pressure inside the container is controlled by controlling the flow rate of filling liquid (L) entering during the filling second step (E2).

6. The process as claimed in claim 3, wherein the overall pressure inside the container is controlled by controlling the flow rate of blowing gas (G) exiting during the second step (E2).

7. The process as claimed in claim 4, wherein the overall pressure inside the container is controlled by controlling the flow rate of blowing gas (G) exiting during the second step (E2).

8. The process as claimed in claim 1, wherein during the third step (E3) of shaping the container the outlet orifice of the container is sealed and prevents the flushing of the blowing gas through the outlet orifice.

* * * * *